(12) United States Patent
Wakayama et al.

(10) Patent No.: US 10,050,508 B2
(45) Date of Patent: Aug. 14, 2018

(54) ELECTRIC MOTOR HAVING A FIELD ELEMENT AND AN ARMATURE WITH A CARRIER

(71) Applicant: Mitsubishi Electric Corporation, Chiyoda-ku (JP)

(72) Inventors: Hiroshi Wakayama, Tokyo (JP); Ryutaro Inagaki, Tokyo (JP); Shinichi Yamaguchi, Tokyo (JP); Kazumasa Ito, Tokyo (JP); Kenta Motoyoshi, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/564,067

(22) PCT Filed: May 27, 2015

(86) PCT No.: PCT/JP2015/065290
§ 371 (c)(1),
(2) Date: Oct. 3, 2017

(87) PCT Pub. No.: WO2016/189706
PCT Pub. Date: Dec. 1, 2016

(65) Prior Publication Data
US 2018/0097433 A1    Apr. 5, 2018

(51) Int. Cl.
*H02K 41/02* (2006.01)
*H02K 1/18* (2006.01)
*H02K 33/00* (2006.01)

(52) U.S. Cl.
CPC ............... *H02K 41/02* (2013.01); *H02K 1/18* (2013.01); *H02K 33/00* (2013.01)

(58) Field of Classification Search
CPC ........ H02K 41/00–41/065; H02K 1/04; H02K 16/00–16/04
(Continued)

(56) References Cited

U.S. PATENT DOCUMENTS

2004/0032170 A1    2/2004  Tamai et al.
2005/0140213 A1    6/2005  Miyamoto et al.
(Continued)

FOREIGN PATENT DOCUMENTS

JP    11-27926 A    1/1999
JP    11-27927 A    1/1999
(Continued)

OTHER PUBLICATIONS

Machine Translation, Yamanaka, JP 2010063193 A, Mar. 2010.*
(Continued)

*Primary Examiner* — Thomas Truong
(74) *Attorney, Agent, or Firm* — Oblon, McClelland, Maier & Neustadt, L.L.P.

(57) ABSTRACT

An armature has a plurality of armature cores arranged in a line in a first direction, coils wound on an area of the armature cores in a second direction, a carrier provided with a space in which to dispose the coils left in a third direction orthogonal to the first direction and the second direction with respect to the armature cores, and at least one mounting member to fix the armature cores and the carrier. The armature cores are fixed to the mounting member by first bolts, and the carrier is fixed to the mounting member by second bolts. The at least one mounting member, the first bolts, and the second bolts are disposed in positions not overlapping the coils when viewed from the third direction.

25 Claims, 15 Drawing Sheets

(58) Field of Classification Search
USPC ..... 310/12.01–12.33, 194, 216.113, 216.127
See application file for complete search history.

(56) References Cited

U.S. PATENT DOCUMENTS

| | | | |
|---|---|---|---|
| 2006/0012252 A1* | 1/2006 | Miyata | H02K 41/031 310/12.18 |
| 2006/0017331 A1* | 1/2006 | Desailly | H02K 41/031 310/12.29 |
| 2006/0049697 A1 | 3/2006 | Binnard | |
| 2006/0232142 A1 | 10/2006 | Binnard | |
| 2007/0205673 A1* | 9/2007 | Sugita | H02K 41/03 310/12.15 |
| 2007/0247008 A1* | 10/2007 | Miyamoto | H02K 41/03 310/14 |
| 2010/0181848 A1 | 7/2010 | Nagasaka | |

FOREIGN PATENT DOCUMENTS

| | | |
|---|---|---|
| JP | 2000-14119 A | 1/2000 |
| JP | 2002-44928 A | 2/2002 |
| JP | 2003-219627 A | 7/2003 |
| JP | 2007-274886 A | 10/2007 |
| JP | 2009-112152 A | 5/2009 |
| JP | 2009-189116 A | 8/2009 |
| JP | 2009-207240 A | 9/2009 |
| JP | 2010-63193 A | 3/2010 |
| JP | 2010063193 A * | 3/2010 |
| JP | 2010-172070 A | 8/2010 |
| JP | 2011-205841 A | 10/2011 |
| JP | 2014-087208 A | 5/2014 |
| KR | 10-2003-0059820 A | 7/2003 |
| KR | 10-2012-0080021 A | 7/2012 |

OTHER PUBLICATIONS

International Search Report dated Aug. 18, 2015, in PCT/JP2015/065290 filed May 27, 2015.

Office Action dated Jan. 6, 2016, in corresponding JP Application 2015-557104 filed May 27, 2015, with an English Translation, 12 pages.

Korean Office Action dated Feb. 20, 2018 in Patent Application No. 10-2017-7032890 (with English translation), 13 pages.

* cited by examiner

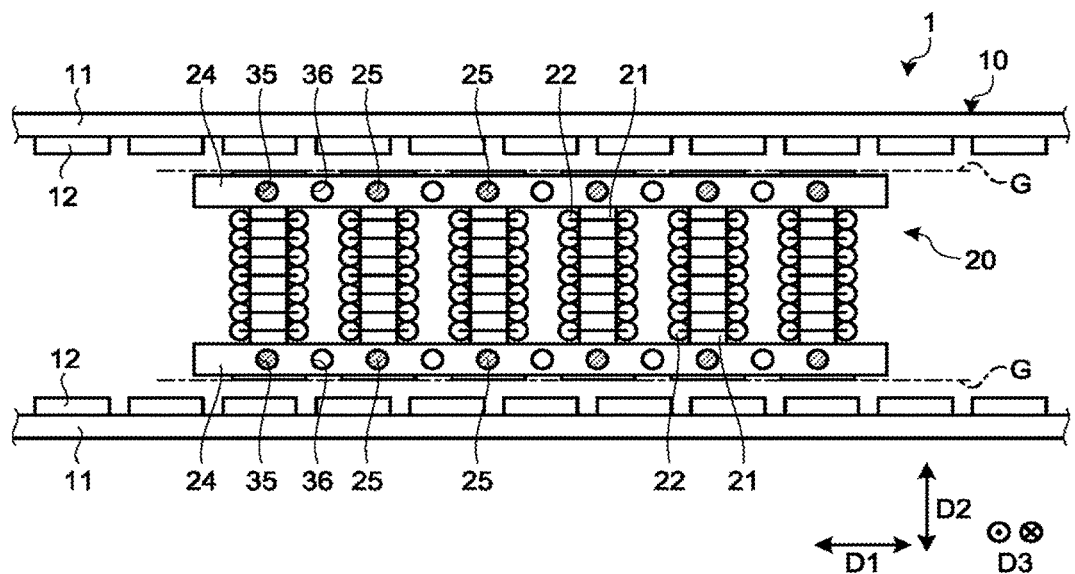
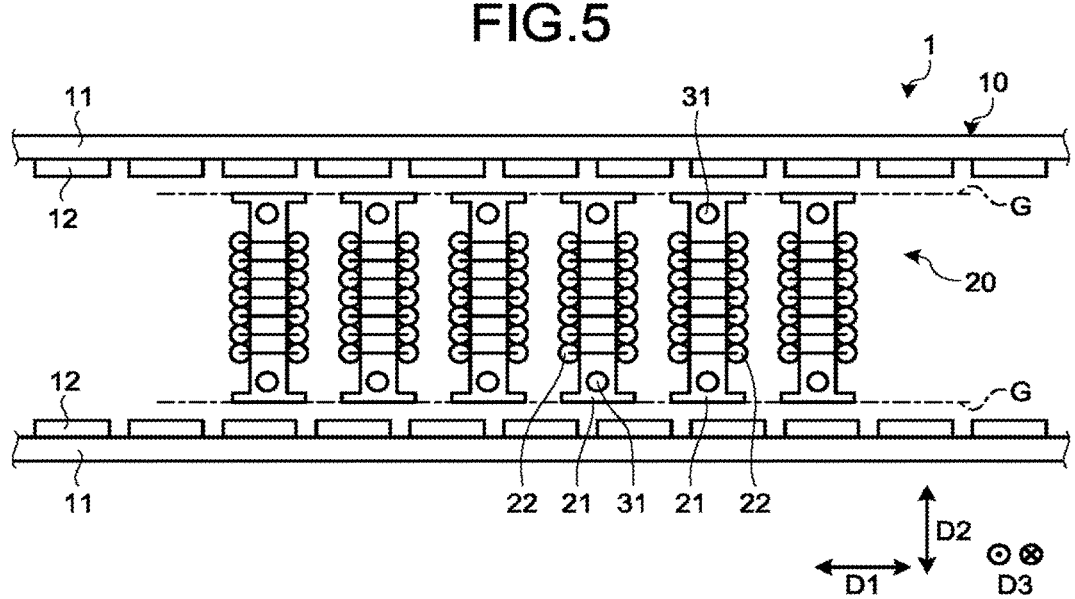

ELECTRIC MOTOR HAVING A FIELD ELEMENT AND AN ARMATURE WITH A CARRIER

FIELD

The present invention relates to an electric motor that includes a field element and an armature.

BACKGROUND

Electric motors are known as apparatuses for transferring carriers. An electric motor generates thrust between a field element as a stator, and an armature as a moving element, to move the armature in one direction. The armature has a plurality of armature cores on which coils are wound. A gap face of the armature cores is disposed opposite to the field element. In recent years, it has been demanded to increase the outputs of electric motors or to reduce the sizes of electric motors by making the areas of gap faces larger.

Patent Literature 1 describes an electric motor that includes a plurality of armature cores on which coils are wound, an armature mounting plate disposed above the armature cores, and a table fixed to the top of the armature mounting plate. The plurality of armature cores is fixed to the armature mounting plate by fastening bolts. The table is fixed to the armature mounting plate by fastening bolts.

CITATION LIST

Patent Literature

Patent Literature 1: Japanese Patent Application Laid-Open Publication No. 2003-219627

SUMMARY

Technical Problem

In the armature described in Patent Literature 1 above, the armature mounting plate is disposed above the coils, that is, in a space between the coils and the table. This configuration requires a space in the vertical direction for disposing the armature mounting plate. Thus, the size of the armature cores can be limited in the vertical direction with respect to the size of the entire armature. In this case, it can be difficult to make the area of gap faces larger in the vertical direction, and it can be difficult to increase the output of the electric motor. Or it can be difficult to reduce the size of the electric motor in the vertical direction with respect to the armature cores.

The present invention has been made in view of the above, and has an object of providing an electric motor that can be increased in output or reduced in size.

Solution to Problem

In order to solve the foregoing problems and achieve the object, an electric motor according to the present invention includes: a field element; and an armature to generate thrust between the armature and the field element to move, the field element having a plurality of magnets arranged in a line, with polarity differing alternately in a first direction, which is a direction in which the armature moves, the armature being disposed in a position opposite to the magnets in a second direction orthogonal to the first direction, the armature having: a plurality of armature cores arranged in a line in the first direction, coils wound on an area of the armature cores in the second direction, a carrier provided with a space in which to dispose the coils left in a third direction orthogonal to the first direction and the second direction with respect to the plurality of armature cores, and at least one mounting member to fix the plurality of armature cores and the carrier, the plurality of armature cores being fixed to the at least one mounting member by first fastening members, the carrier being fixed to the at least one mounting member by second fastening members, the at least one mounting member, the first fastening members, and the second fastening members being disposed in positions not overlapping the coils when viewed from the third direction.

Advantageous Effects of Invention

The present invention achieves the effect that an electric motor that can be increased in output or reduced in size can be obtained.

BRIEF DESCRIPTION OF DRAWINGS

FIG. 4 is a plan view of the electric motor according to the first embodiment.
FIG. 5 is a plan view of the electric motor according to the first embodiment.

DESCRIPTION OF EMBODIMENTS

Hereinafter, an electric motor according to embodiments of the present invention will be described in detail with reference to the drawings. The embodiments are not intended to limit the invention.

First Embodiment

Figure 1:
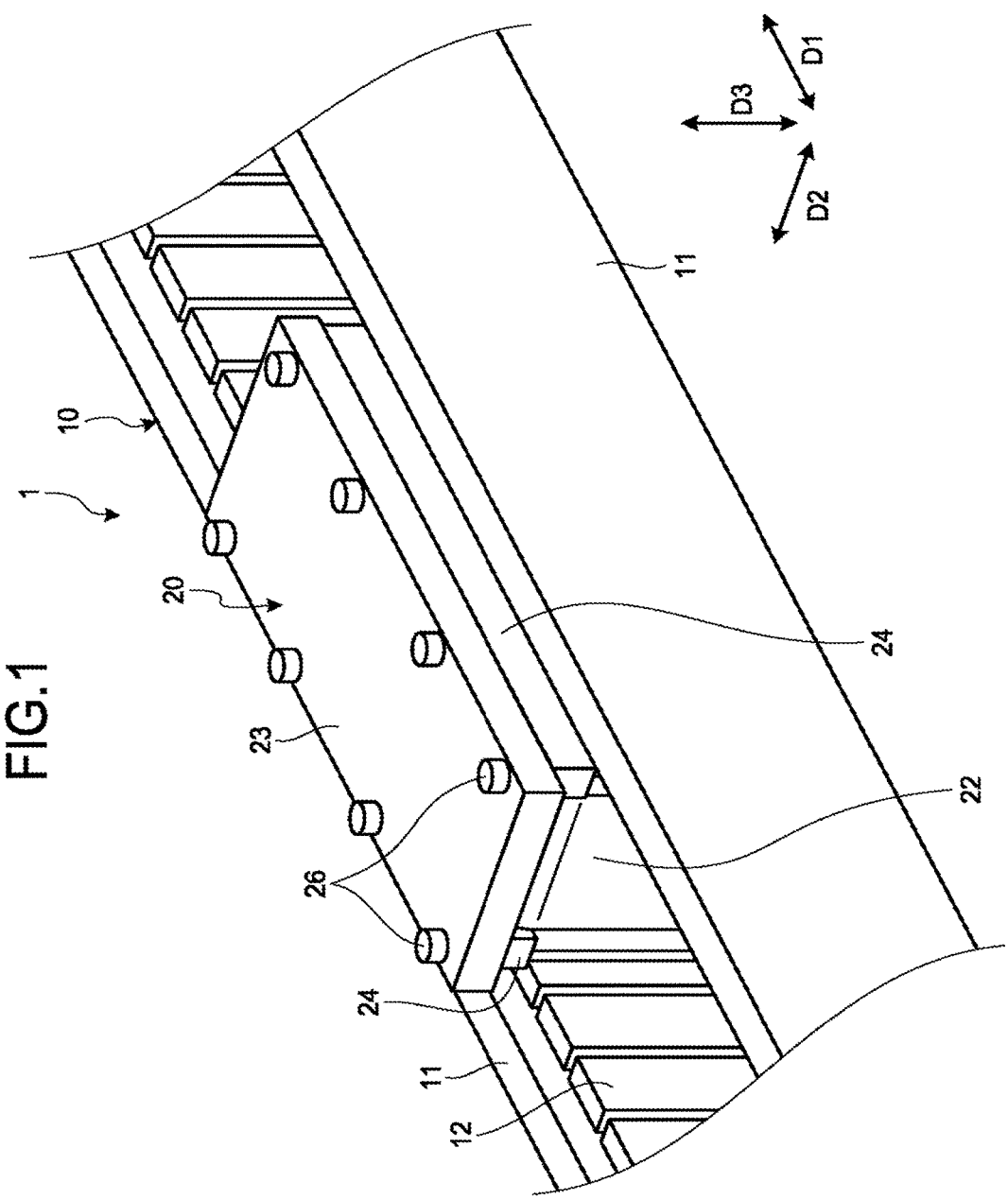
FIG. 1 is a perspective view of an electric motor according to a first embodiment.
Figure 2:
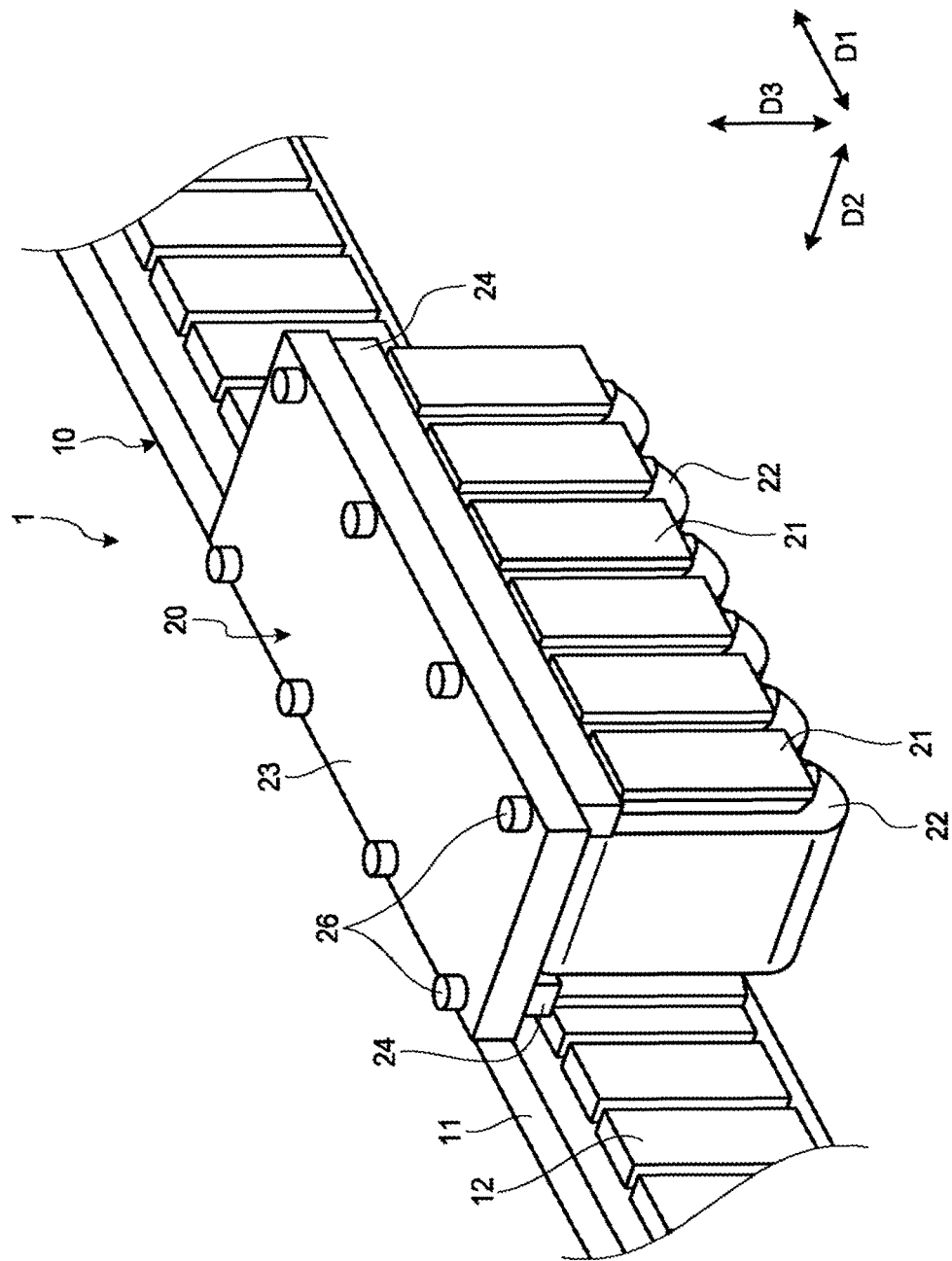
FIG. 2 is a perspective view of the electric motor according to the first embodiment.
Figure 3:
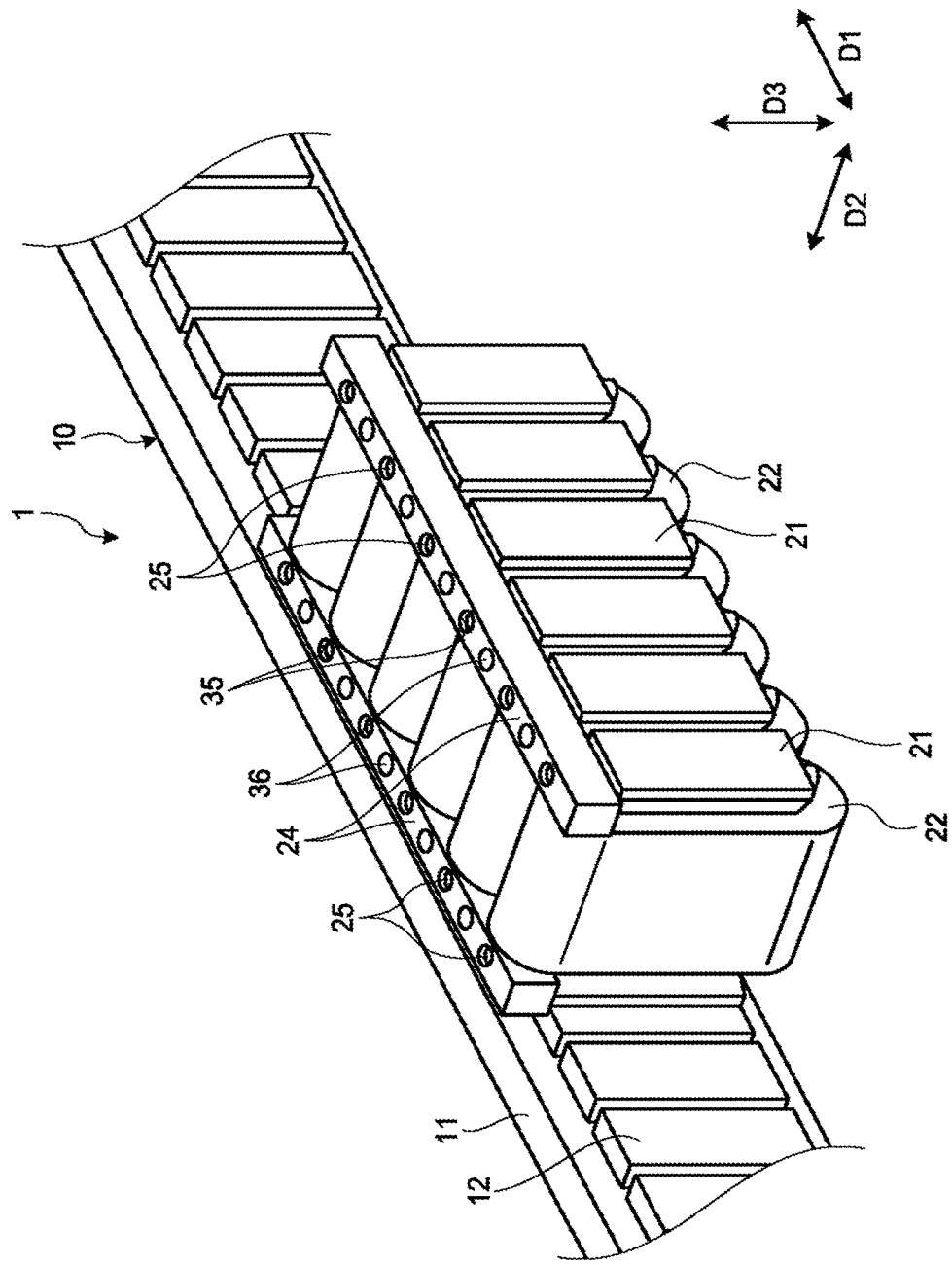
FIG. 3 is a perspective view of the electric motor according to the first embodiment.

FIGS. 1 to 3 are perspective views of an electric motor 1 according to a first embodiment. FIG. 2 illustrates a stats where a field yoke 11 and permanent magnets 12 on one side of the electric motor 1 illustrated in FIG. 1 are removed. FIG. 3 illustrates a state where the field yoke 11 and the permanent magnets 12 on one side and a carrier 23 of the electric motor 1 illustrated in FIG. 1 are removed. FIGS. 4 and 5 are plan views of the electric motor 1 according to the first embodiment. FIG. 5 illustrates a state where mounting members 24 of the electric motor 1 illustrated in FIG. 4 are removed.

As illustrated in FIGS. 1 to 5, the electric motor 1 includes a field element 10 as a stator, and an armature 20 as a moving element. The electric motor 1 moves the armature 20 in a first direction D1 by thrust generated between the field element 10 and the armature 20. The electric motor 1 is a bilateral-system electric motor in which thrust generation planes are formed on both sides of the armature 20 in a second direction D2. The carrier 23 is provided at the armature 20. The electric motor 1 moves the armature 20 holding the carrier 23, thereby carrying the carrier 23. In the first embodiment, the carrier 23 is described as a flat plate. The carrier 23 corresponds to a moving portion of a mechanical apparatus, and corresponds to a head of a mounter, or a carriage or stage on which a load is placed.

The field element 10 has two field yokes 11 and a plurality of permanent magnets 12. The two field yokes 11 are spaced in the second direction D2. The two field yokes 11 are formed in a shape extending in the first direction D1. The two field yokes 11 are arranged in parallel.

The plurality of permanent magnets 12 is provided on the field yokes 11. The plurality of permanent magnets 12 are arranged with a regular pitch in a row along the first direction D1 on each field yoke 11. Thus, the plurality of permanent magnets 12 is provided in two rows spaced in the second direction D2. The polarity of the permanent magnets 12 differs alternately in the first direction D1.

The armature 20 is disposed between the two rows of the permanent magnets 12 in the second direction D. The armature 20 has a plurality of armature cores 21 arranged in a line in the first direction D1 and coils 22 wound on the armature cores 21.

The armature cores 21 are formed with a plurality of plate-shaped core members stacked. The core members are stacked in a third direction D3 orthogonal to the first direction D1 and the second direction D2. The armature cores 21 are formed of a divided core divided into teeth. Both end faces of the armature cores 21 in the second direction D2 constitute gap faces G disposed opposite to the permanent magnets 12. The coils 22 are wound on central portions of the armature cores 21 in the second direction D2. The coils 22 are wound via insulators. The insulators are not shown in the first embodiment.

Bolt holes 31 are provided at both ends of the armature cores 21 in the second direction D2. The bolt holes 31 are formed through the armature cores 21 in the third direction D3. First bolts 25, first fastening members that fasten the armature cores 21 to the mounting members 24, are inserted into the bolt holes 31. Since the bolt holes 31 are provided at each armature core 21, the bolt holes 31 are arranged in a line in the first direction D1 at the plurality of armature cores 21.

The armature 20 also has the carrier 23 provided in a position in the third direction D3 with respect to the plurality of armature cores 21, and the mounting members 24 that fix the plurality of armature cores 21 and the carrier 23.

The carrier 23 is formed in a rectangular plate shape, and is fixed to the mounting members 24 by second bolts 26 as second fastening members. The carrier 23 is disposed over all the plurality of armature cores 21 in the first direction D1 and the second direction D2.

The mounting members 24 are formed in a rectangular column shape, and disposed along the first direction D1. The mounting members 24 are disposed at both end portions of the armature cores 21 in the second direction D2. The mounting members 24 are disposed on areas of the top surfaces of the armature cores 21 on which the coils 22 are not provided. The mounting members 24 are disposed across all the plurality of armature cores 21 in the first direction D1. The mounting members 24 are formed using a non-magnetic material. In the first embodiment, the mounting members 24 are formed using SUS. By making the mounting members 24 from a non-magnetic material, magnetic flux passing through the mounting members 24 can be reduced. This can prevent leakage flux, and thus the electric motor 1 can be prevented from thrust reduction. The mounting members 24 may be formed using a non-magnetic and non-conductive material. By making the mounting members 24 from a non-conductive material, eddy currents flowing through the mounting members 24 can be prevented. This can prevent thrust reduction of the electric motor 1 due to iron loss.

Figure 6:
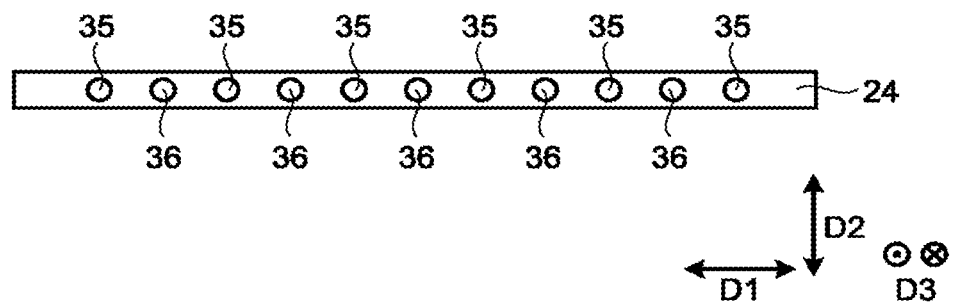
FIG. 6 is a plan view of a mounting member of the electric motor according to the first embodiment.

FIG. 6 is a plan view of the mounting member 24 of the electric motor 1 according to the first embodiment. As illustrated in FIG. 6, the mounting member 24 has first bolt holes 35 and second bolt holes 36 arranged in a line in the first direction D1. The first bolt holes 35 and the second bolt holes 36 are arranged alternately with a regular pitch in the first direction D1. The first bolt holes 35 and the second bolt holes 36 are formed through the mounting member 24 in the third direction D3. The second bolt holes 36 need not pass through the mounting member 24 in the third direction D3. In this case, the second bolt holes 36 are formed in upper portions of the mounting member 24 in the third direction D3.

Figure 7:
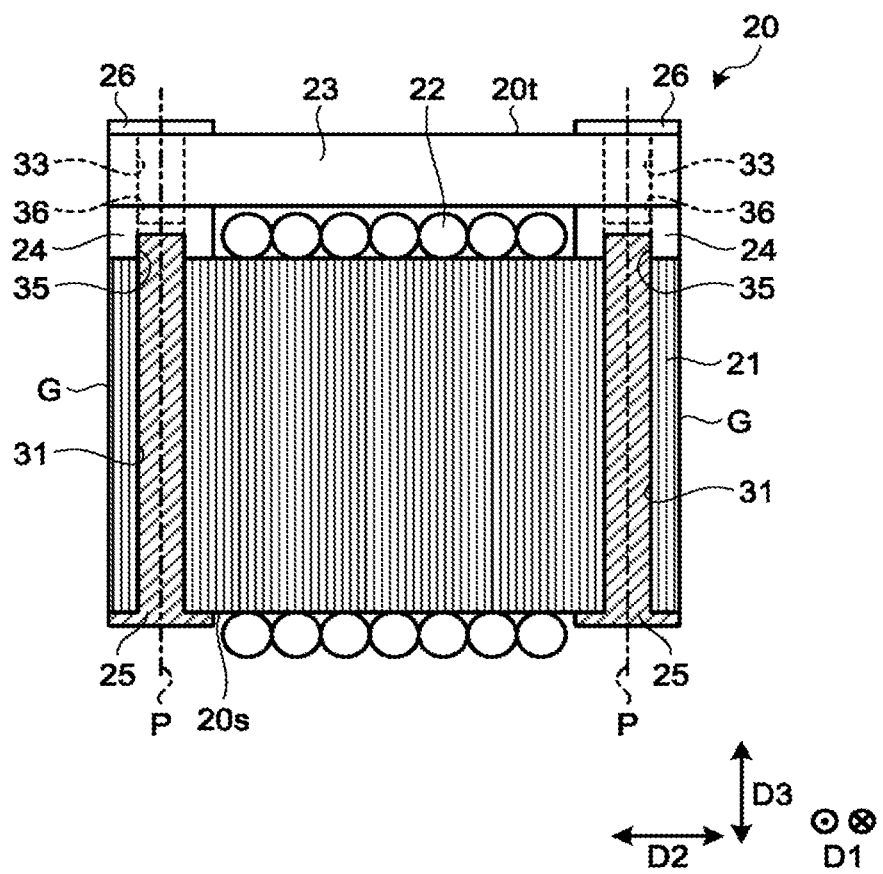
FIG. 7 is a cross-sectional view of an armature of the electric motor according to the first embodiment.

FIG. 7 is a cross-sectional view of the armature 20 of the electric motor 1 according to the first embodiment. As illustrated in FIG. 7, the first bolt holes 35 are disposed in positions coinciding with the bolt holes 31 of the armature core 21 when viewed in the third direction D3. The first bolts 25 are disposed at a lower-side end of the armature core 21. The first bolts 25 are passed through the bolt holes 31 of the armature core 21 in the third direction D3 and inserted into the first bolt holes 35. Consequently, the armature core 21 is fastened to the mounting members 24 by the first bolts 25. Thus, the first bolts 25 are provided at a lower-side end 20s, a first end of the armature 20 in the third direction D3.

Second bolts 26 as second fastening members are inserted into the second bolt holes 36. The second bolts 26 are disposed at an upper-side end of the carrier 23. The second bolts 26 are passed through bolt holes 33 of the carrier 23 in the third direction D3 and inserted into the second bolt holes 36. Consequently, the carrier 23 is fastened to the mounting members 24 by the second bolts 26. Thus, the second bolts 26 are provided at an upper-side end 20t, a second end, of the armature 20 in the third direction D3.

As illustrated in FIG. 7, the carrier 23 is provided with a space in which to dispose the coils 22 left in the third direction D3 with respect to the plurality of armature cores 21. The dimension in the third direction D3 of the mounting members 24 is formed to allow the disposition of upper end portions of the coils 22. The upper end portions of the coils 22 are disposed in a space between the top surfaces of the armature cores 21 and the carrier 23. The mounting members 24, the first bolts 25, and the second bolts 26 are disposed away from the space between the coils 22 and the carrier 23. That is, the mounting members 24, the first bolts 25, and the second bolts 26 are disposed in positions not overlapping the coils 22 when viewed from the third direction D3. Thus, the dimension between the top surfaces of the armature cores 21 and the carrier 23 can be set in a range that allows the disposition of the upper end portions of the coils 22.

The first bolts 25 disposed at the underside of the armature cores 21 and the second bolts 26 disposed above the armature cores 21 are arranged in straight lines along the first direction D1 when viewed in the third direction D3. That is, the first bolts 25 and the second bolts 26 are disposed in planes P along the gap faces G. Thus, the first bolts 25 and the second bolts 26 are efficiently arranged in the second direction D2, so that a space in which to wind the coils 22 can be provided in the second direction D2.

As above, according to the first embodiment, the mounting members 24, the first bolts 25, and the second bolts 26 are disposed in positions not overlapping the coils 22 when viewed from the third direction D3, so that the dimensions of the mounting members 24 need not be considered when the dimension between the armature cores 21 and the carrier 23 is set. Thus, the dimension in the third direction D3 of the armature cores 21 can be increased, and the area of the gap faces G of the armature cores 21 can be made larger, so that the output of the electric motor 1 can be increased. Or the armature 20 can be configured to be reduced in size in the third direction D3 with respect to the armature cores 21.

Second Embodiment.

Figure 8:
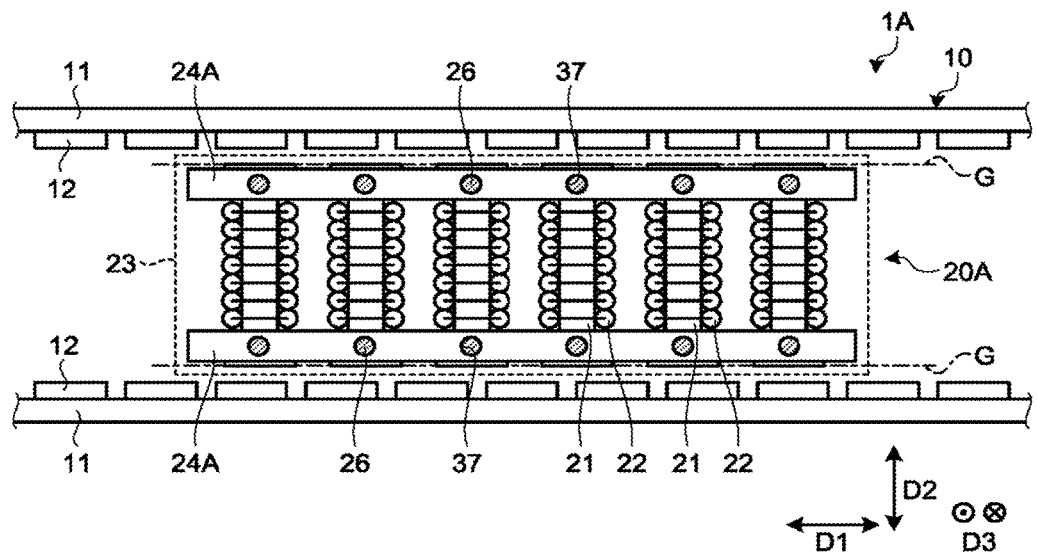
FIG. 8 is a plan view of an electric motor according to a second embodiment.
Figure 9:
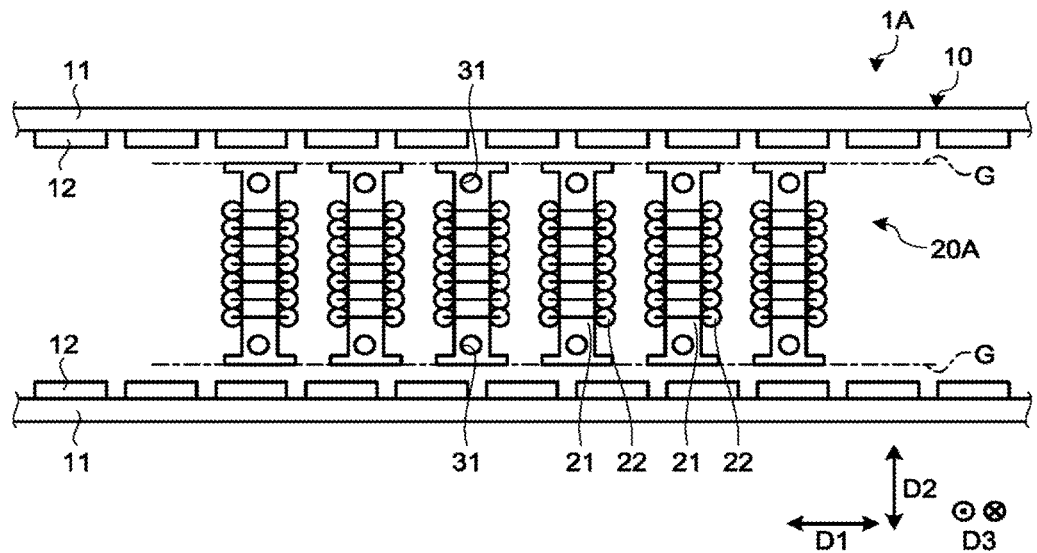
FIG. 9 is a plan view of the electric motor according to the second embodiment.

FIGS. 8 and 9 are plan views of an electric motor 1A according to a second embodiment. FIG. 9 illustrates a state where mounting members 24A and a carrier 23 of the electric motor 1A illustrated in FIG. 8 are removed. In the second embodiment, the same components as those of the electric motor 1 according to the first embodiment are given the same reference characters, and their descriptions are omitted or simplified. As illustrated in FIGS. 8 and 9, the electric motor 1A includes a field element 10 and an armature 20A. The armature 20A is disposed between two rows of permanent magnets 12. The armature 20A has a plurality of armature cores 21, coils 22, the carrier 23, and the mounting members 24A.

Figure 10:
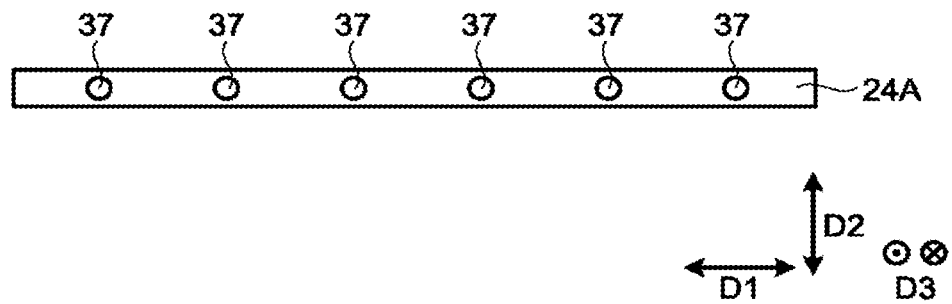
FIG. 10 is a plan view of a mounting member of the electric motor according to the second embodiment.

FIG. 10 is a plan view of the mounting member 24A of the electric motor 1A according to the second embodiment. As illustrated in FIG. 10, the mounting member 24A has bolt holes 37 arranged in a line with a regular pitch in a first direction D1. The bolt holes 37 are formed through the mounting member 24A in a third direction D3. The pitch of the bolt holes 37 is equal to the pitch of bolt holes 31 formed in the armature cores 21.

Figure 11:
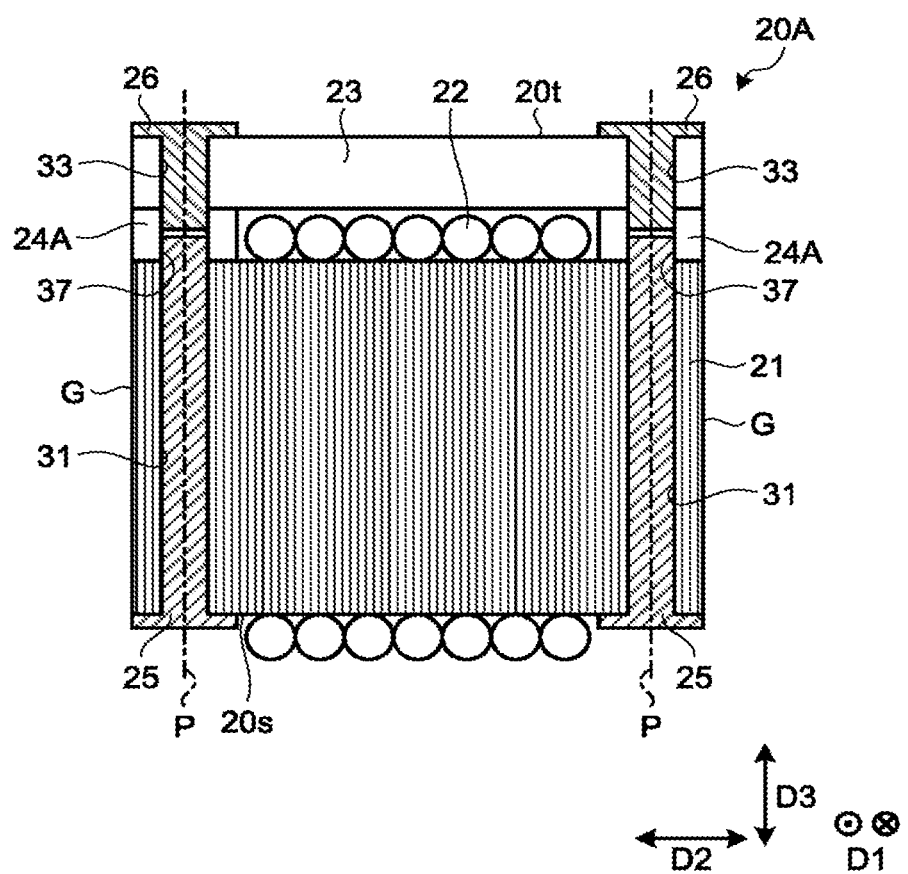
FIG. 11 is a cross-sectional view of an armature of the electric motor according to the second embodiment.

FIG. 11 is a cross-sectional view of the armature 20A of the electric motor 1A according to the second embodiment. As illustrated in FIG. 11, both first bolts 25 as first fastening members and second bolts 26 as second fastening members are inserted into the bolt holes 37. The first bolts 25 are disposed at a lower-side end of the armature core 21 in the third direction D3. The first bolts 25 are passed through the armature core 21 from below upward in the third direction D3, and inserted into the lower sides of the bolt holes 37. Consequently, the armature core 21 is fastened to the mounting members 24A by the first bolts 25. The second bolts 26 are disposed at an upper-side end of the carrier 23. The second bolts 26 are passed through bolt holes 33 of the carrier 23 from above downward, and inserted into upper portions of the bolt holes 37. Consequently, the carrier 23 is fastened to the mounting members 24A by the second bolts 26. Thus, the first bolts 25 are provided at a lower-side end 20s, a first end, of the armature 20A in the third direction D3. The second bolts 26 are provided at an upper-side end 20t, a second end, of the armature 20A in the third direction D3.

As above, in the second embodiment, both the first bolts 25 and the second bolts 26 are inserted into the bolt holes 37, so that the number of the bolt holes 37 in the mounting members 24A can be made smaller than the number of the bolt holes 37 in the mounting members 24A in the first embodiment. Consequently, the number of man-hours in machining and forming the bolt holes 37 in the mounting members 24A can be reduced. This enables a reduction in cost and an increase in mechanical strength of the mounting members 24A.

Third Embodiment.

Figure 12:
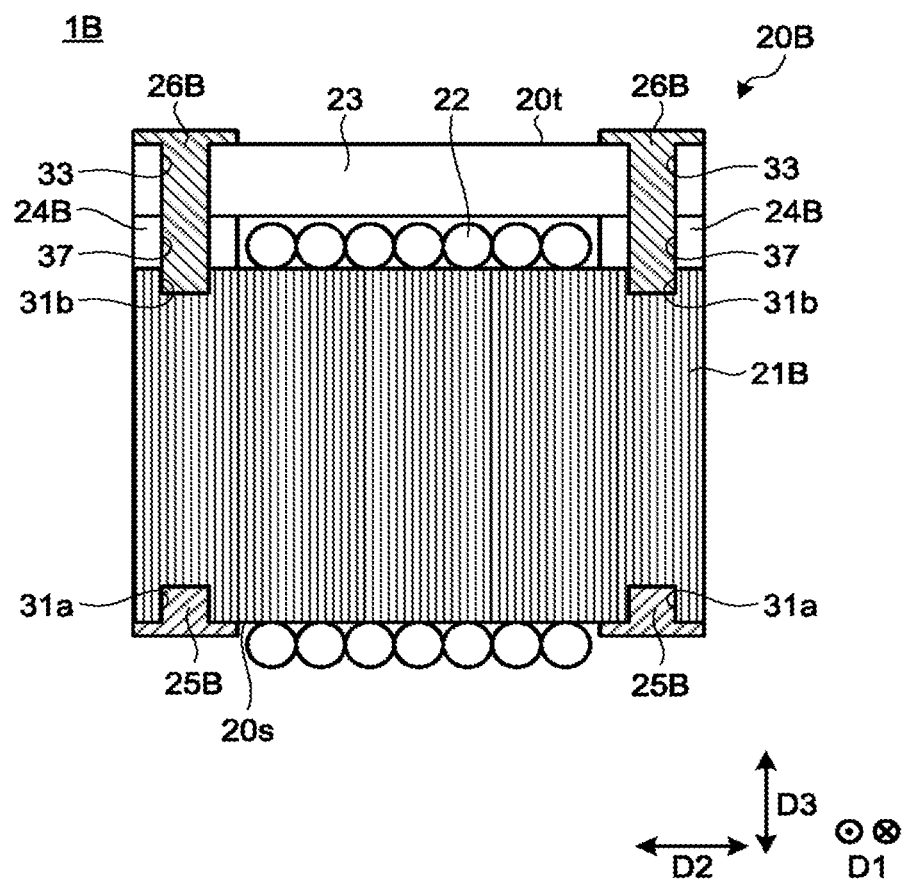
FIG. 12 is a cross-sectional view of an armature of an electric motor according to a third embodiment.

FIG. 12 is a cross-sectional view of an armature 20B of an electric motor 1B according to a third embodiment. In the third embodiment, the same components as those of the electric motor 1 according to the first embodiment are given the same reference characters, and their descriptions are omitted or simplified. As illustrated in FIG. 12, the armature 20B has a plurality of armature cores 21B, coils 22, a carrier 23, and mounting members 24B.

In the armature cores 21B, plate-shaped core members are stacked in a third direction D3, and the core members are fixed to each other by punch crimping or bonding. The armature cores 21B have bolt holes 31b at the top surfaces, and have bolt holes 31a at the undersurfaces. The bolt holes 31b and the bolt holes 31a are disposed in coinciding positions when viewed in the third direction D3. The bolt holes 31b and the bolt holes 31a are formed without being passed through the armature cores 21B. Thus, in the armature cores 21B, the core members are disposed in portions between the bolt holes 31b and the bolt holes 31a in the third direction D3.

The mounting members 24B have bolt holes 37 arranged in a line with a regular pitch in a first direction D1. The bolt holes 37 are formed through the mounting members 24A in the third direction D3. The pitch of the bolt holes 37 is equal to the pitch of the bolt holes 31b and the bolt holes 31a formed in the armature cores 21B in the first direction D1.

Bolts 26B serving as first fastening members and second fastening members are inserted into the bolt holes 37. The bolts 26B are disposed at the top of the carrier 23. The bolts 26B are passed through bolt holes 33 of the carrier 23 and the bolt holes 37 of the mounting members 24B in the third direction D3, and inserted into the bolt holes 31b. Consequently, the armature cores 21B and the carrier 23 are fastened to the mounting members 24 by the bolts 26B. Bolts 25B are inserted into the bolt holes 31a formed at the undersurfaces of the armature cores 21B. In the third embodiment, the bolt holes 31a and the bolts 25B need not be provided.

As above, according to the third embodiment, in end portions of the armature cores 21B in a second direction D2, bolt holes are not provided in central portions in the third direction D3 but the core members are disposed. This configuration can prevent occurrence of magnetic saturation in the end portions of the armature cores 21B in the second direction D2. Consequently, in the electric motor 1B, a reduction in current-thrust characteristics can be prevented, and an increase in cogging thrust can be prevented.

Fourth Embodiment.

Figure 13:
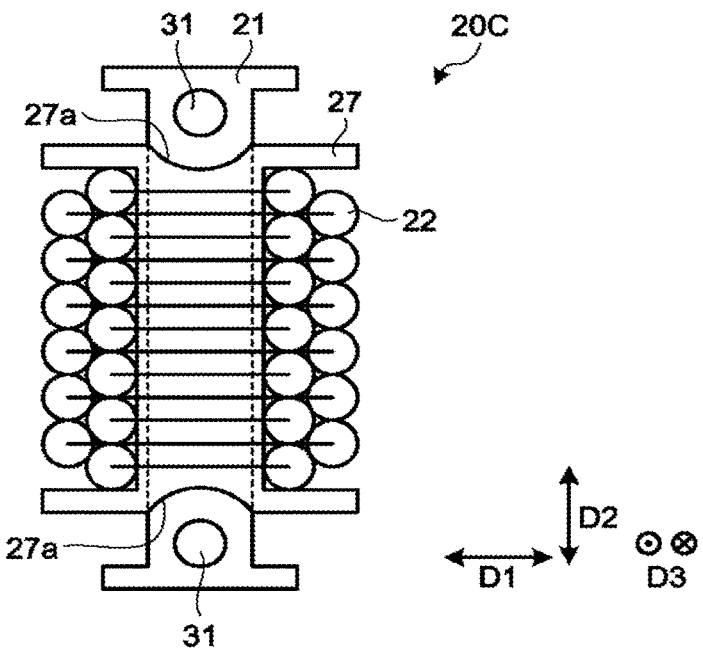
FIG. 13 is a plan view illustrating part of an armature of an electric motor according to a fourth embodiment.

FIG. 13 is a plan view illustrating part of an armature 20C according to a fourth embodiment. FIG. 13 illustrates an insulator 27 fitted to an armature core 21. In the fourth embodiment, the same components as those of the armature cores 21 according to the first embodiment are given the same reference characters, and their descriptions are omitted or simplified.

As illustrated in FIG. 13, the insulator 27 is provided at the armature core 21 to provide insulation from a coil 22. The coil 22 is wound on the insulator 27. The insulator 27 is disposed at a central portion of the armature core 21 in a second direction D2.

Recessed portions 27a are formed at both end portions of the insulator 27 in the second direction D2. The recessed portions 27a are formed in a shape curved toward the center in the second direction D2. The provision of the recessed portions 27a can avoid interference between the both end portions of the insulator 27 in the second direction D2 and bolts fastened to the armature core 21.

As above, according to the fourth embodiment, the recessed portions 27a are provided at the both end portions of the insulator 27 in the second direction D2, so that interference between the insulators 27 and the bolts can be avoided. This can enlarge a space for disposing the coil 22 toward the both ends in the second direction D2, so that the coil space factor on the armature core 21 can be increased. The increased coil space factor enables a reduction in the copper loss caused by the coils 22, and enables a size reduction or a thrust increase of an electric motor having the armature 20C.

Fifth Embodiment.

Figure 14:
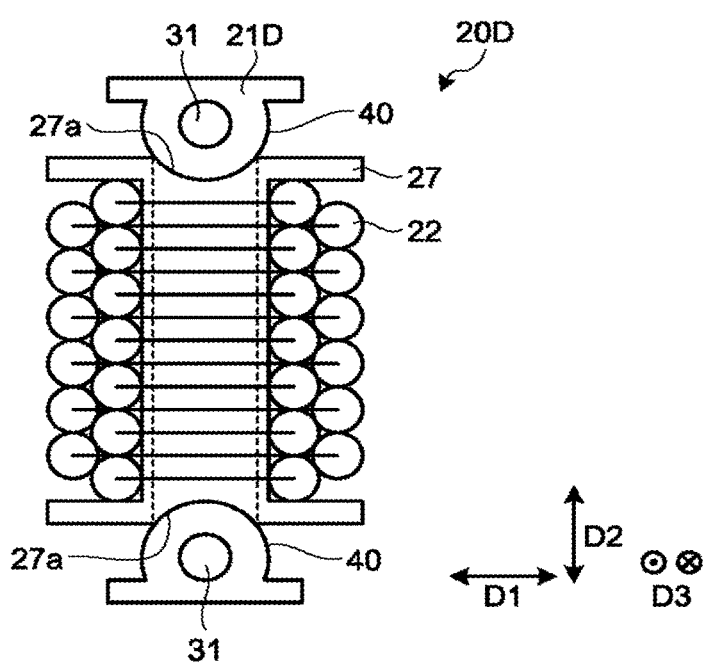
FIG. 14 is a plan view illustrating part of an armature of an electric motor according to a fifth embodiment.

FIG. 14 is a plan view illustrating part of an armature 20D according to a fifth embodiment. FIG. 14 illustrates an armature core 21D and an insulator 27. In the fifth embodiment, the same components as those of the armature cores 21 according to the first embodiment are given the same reference characters, and their descriptions are omitted or simplified.

As illustrated in FIG. 14, protruding portions 40 curved outward in a first direction D1 are provided at both end portions of the armature core 21D in a second direction D2. The protruding portions 40 protrude in the first direction D1 along the shape of bolt holes 31, insertion holes. The protruding portions 40 are formed in a circular shape. By the provision of the protruding portions 40, the armature core 21D protrudes outward of the bolt holes 31 in the first direction D1, so that a circuit through which magnetic flux flows is enlarged.

According to the fifth embodiment, the both end portions of the armature core 21D in the second direction D2 are formed in a circular shape along the shape of the bolt holes 31, so that magnetic paths can be provided at the both end portions of the armature core 21D in the second direction D2. Thus, magnetic saturation can be avoided at the both end portions of the armature core 21D in the second direction D2. This can prevent degradation in current-thrust characteristics, and increase the output.

Sixth Embodiment.

Figure 15:
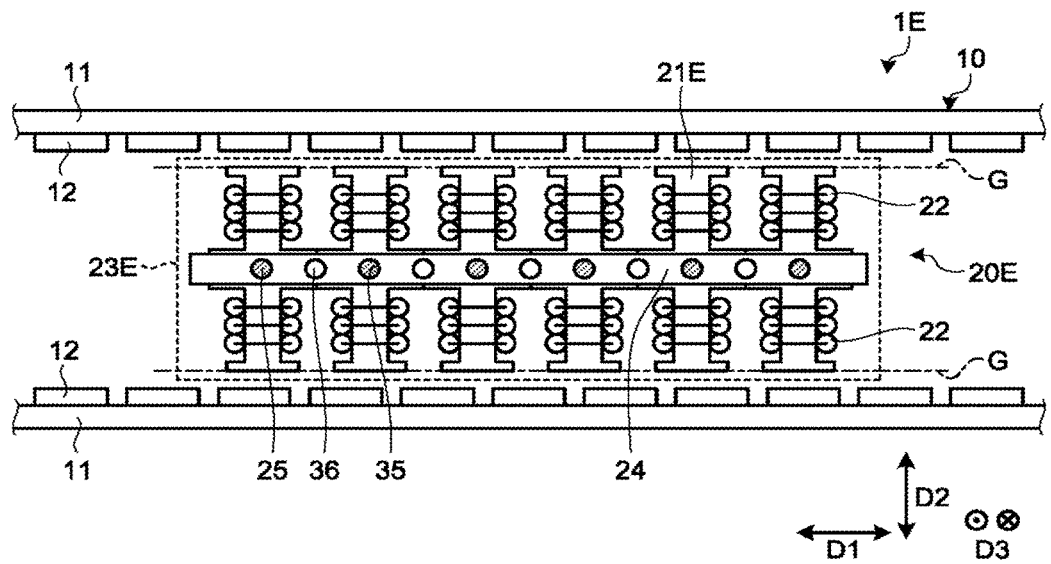
FIG. 15 is a plan view of an electric motor according to a sixth embodiment.
Figure 16:
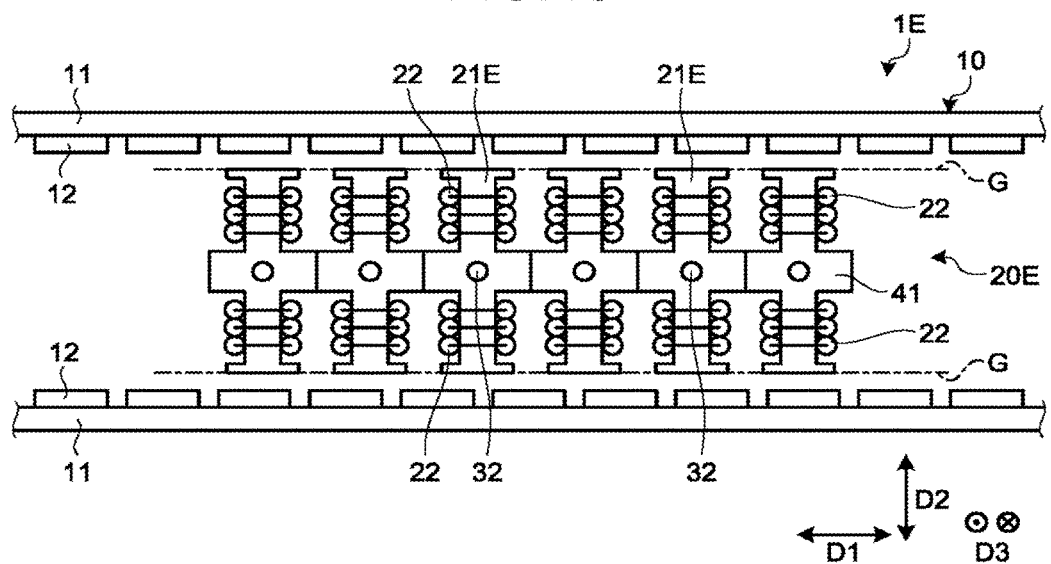
FIG. 16 is a plan view of the electric motor according to the sixth embodiment.

FIGS. 15 and 16 are plan views of an electric motor 1E according to a sixth embodiment. FIG. 16 illustrates a state where a carrier 23E and a mounting member 24 of the electric motor 1E illustrated in FIG. 15 are removed. In the sixth embodiment, the same components as those of the electric motor 1 according to the first embodiment are givers the same reference characters, and their descriptions are omitted or simplified. As illustrated in FIGS. 15 and 16, the electric motor 1E includes a field element 10 and an armature 20E. The armature 20E is disposed between two rows of permanent magnets 12. The armature 20E has a plurality of armature cores 21E, coils 22, the carrier 23E, and the mounting member 24.

Protruding portions 41 are provided at central portions of the armature cores 21E in a second direction D2. The protruding portions 41 protrude outward in a first direction D1. The protruding portions 41 of the armature cores 21E adjacent to each other abut each other at their distal end portions. Bolt holes 32 are formed at the central portions of the armature cores 21E in the second direction D2. The coils 22 are disposed in positions sandwiching the protruding portions 41 in the second direction D2.

The mounting member 24 is disposed at the central portions of the armature cores 21E in the second direction D2. The mounting member 24 is supported on the top surfaces of the protruding portions 41. Thus, the mounting member 24 is disposed on areas of the top surfaces of the armature cores 21E on which the coils 22 are not provided.

Figure 17:
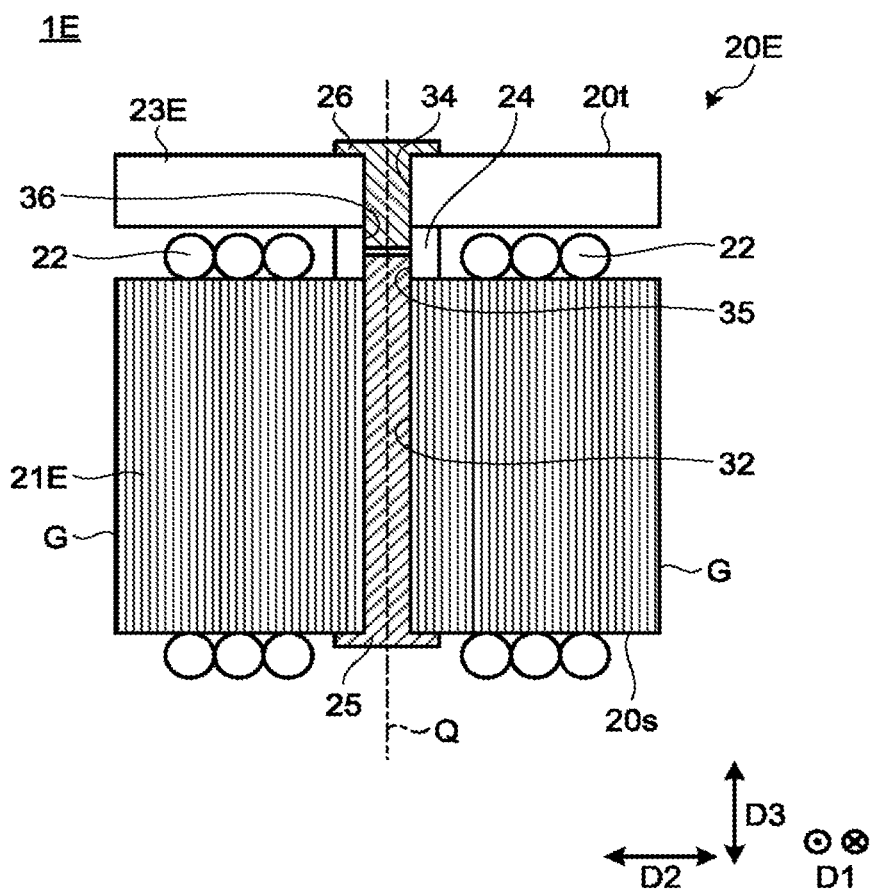
FIG. 17 is a cross-sectional view of an armature of the electric motor according to the sixth embodiment.

FIG. 17 is a cross-sectional view of the armature 20E of the electric motor 1E according to the sixth embodiment. As illustrated in FIG. 17, a first bolt hole 35 is disposed in a position coinciding with the bolt hole 32 of the armature core 21E when viewed in a third direction D3. A first bolt 25 is disposed at a lower-side end of the armature core 21E. The first bolt 25 is passed through the bolt hole 32 of the armature core 21E in the third direction D3 and inserted into the first bolt hole 35. Consequently, the armature core 21E is fastened to the mounting member 24 by the first bolt 25. Thus, the first bolts 25 are provided at a lower-side end 20s, a first end, of the armature 20E in the third direction D3.

A second bolt 26, a second fastening member, is inserted into a second bolt hole 36. The second bolt 26 is disposed at an upper-side end of the carrier 23E. The second bolt 26 is passed through a bolt hole 34 of the carrier 23E in the third direction D3 and inserted into the second bolt hole 36. Consequently, the carrier 23E is fastened to the mounting member 24 by the second bolts 26. Thus, the second bolts 26 are provided at an upper-side end 20t, a second end, of the armature 20E in the third direction D3.

As illustrated in FIG. 17, the dimension in the third direction D3 of the mounting member 24 is formed to allow the disposition of an upper end portion of the coil 22. The upper end portion of the coil 22 is disposed in a space between the top surface of the armature core 21E and the carrier 23E. The mounting member 24, the first bolt 25, and the second bolt 26 are disposed in positions not overlapping the coils 22 when viewed from the third direction D3. Thus, the dimension between the top surfaces of the armature cores 21E and the carrier 23E can be set in a range that allows the disposition of the upper end portions of the coils 22.

The first bolts 25 disposed at the underside of the armature cores 21E and the second bolts 26 disposed above the armature cores 21E are arranged in a straight line along the first direction D1 when viewed in the third direction D3. That is, the first bolts 25 and the second bolts 26 are disposed in a plane Q along gap faces G. The first bolts 25 and the second bolts 26 are provided at one location in the second direction D2. Thus, the first bolts 25 and the second bolts 26 are efficiently arranged in the second direction D2, so that spaces in which to wind the coils 22 can be provided in the second direction D2.

As above, according to the sixth embodiment, the mounting member 24, the first bolts 25, and the second bolts 26 are disposed in positions not overlapping the coils 22 when viewed from the third direction D3, so that the dimension between the armature cores 21E and the carrier 23E can be set to a dimension that allows the disposition of the coils 22, and the dimensions of the mounting member 24 need not foe considered. Thus, the electric motor 1E can be increased in output or reduced in size. The first bolts 25 and the second bolts 26 are provided at one location in the second direction D2, so that spaces in which to wind the coils 22 can be provided in the second direction D2.

Seventh Embodiment.

Figure 18:
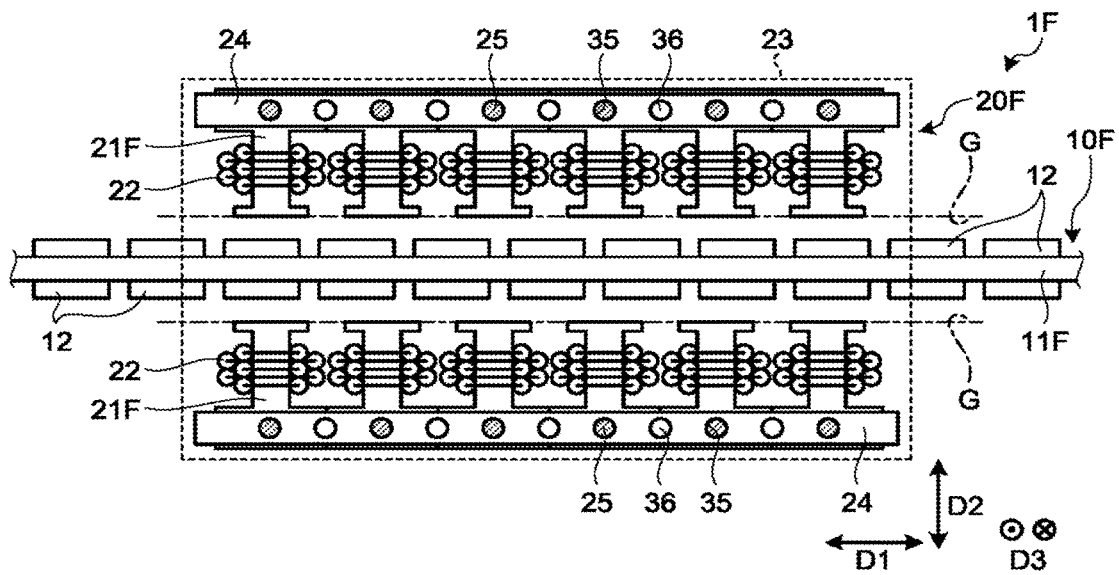
FIG. 18 is a plan view of an electric motor according to a seventh embodiment.
Figure 19:
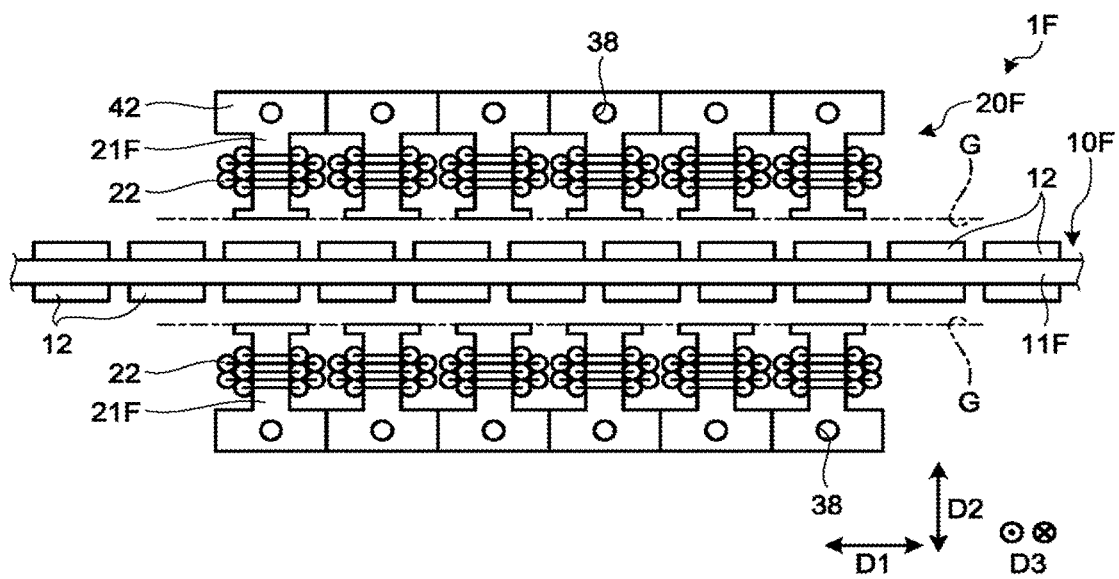
FIG. 19 is a plan view of the electric motor according to the seventh embodiment.

FIGS. 18 and 19 are plan views of an electric motor 1F according to a seventh embodiment. FIG. 19 illustrates a state where mounting members 24 and a carrier 23 of the electric motor 1F illustrated in FIG. 18 are removed. In the seventh embodiment, the same components as those of the electric motor 1 according to the first embodiment are given the same reference characters, and their descriptions are omitted or simplified. As illustrated in FIGS. 18 and 19, the electric motor 1F includes a field element 10F and an armature 20F. In the seventh embodiment, in the armature 20F, two rows of armature cores 21F disposed in a first direction D1 are provided, spaced in a second direction D2. The field element 10F is disposed between the two rows of the armature cores 21F in the second direction D2.

The field element 10F has one field yoke 11F and a plurality of permanent magnets 12. The field yoke 11F is disposed at the center in the second direction D2. The field yoke 11F is formed in a shape extending in the first direction D1. The plurality of permanent magnets 12 is provided on the field yoke 11F. The plurality of permanent magnets 12 is arranged with a regular pitch in a row along the first direction D1 on one side and the other side of the field yoke 11F in the second direction D2. Thus, the plurality of permanent magnets 12 is provided in two rows sandwiching the field yoke 11F in the second direction D2. The polarity of the permanent magnets 12 differs alternately in the first direction D1.

The armature cores 21F are formed with a plurality of plate-shaped core members stacked in a third direction D3. The armature cores 21F are formed of a divided core divided into teeth. End faces of the armature cores 21F on the side of the field element 10F in the second direction D2 constitute gap faces G disposed opposite to the permanent magnets 12. Coils 22 are wound on the armature cores 21F via insulators.

Protruding portions 42 protruding in the first direction D1 are formed a end portions of the armature cores 21F opposite to the field element 10F in the second direction D2. Distal ends of the protruding portions 42 abut each other between the armature cores 21F adjacent to each other. Bolt holes 38 are provided at end portions of the armature cores 21F on the side of the protruding portions 42 in the second direction D2. The bolt holes 38 are formed through the armature cores 21F in the third direction D3. First bolts 25, first fastening members, are inserted into the bolt holes 36. The bolt holes 38 are arranged in a line in the first direction D1 at the plurality of armature cores 21F.

The armature 20F has the carrier 23 and the mounting members 24. The mounting members 24 are provided at the rows of the armature cores 21F, one at each. The mounting members 24 are disposed across all the plurality of armature cores 21F in the first direction D1. The mounting members 24 are disposed at end portions of the armature cores 21F opposite to the field element 10F in the second direction. The mounting members 24 are supported on the top surfaces of the protruding portions 42. The mounting members 24 are disposed on areas of the top surfaces of the armature cores 21F on which the coils 22 are not provided.

Figure 20:
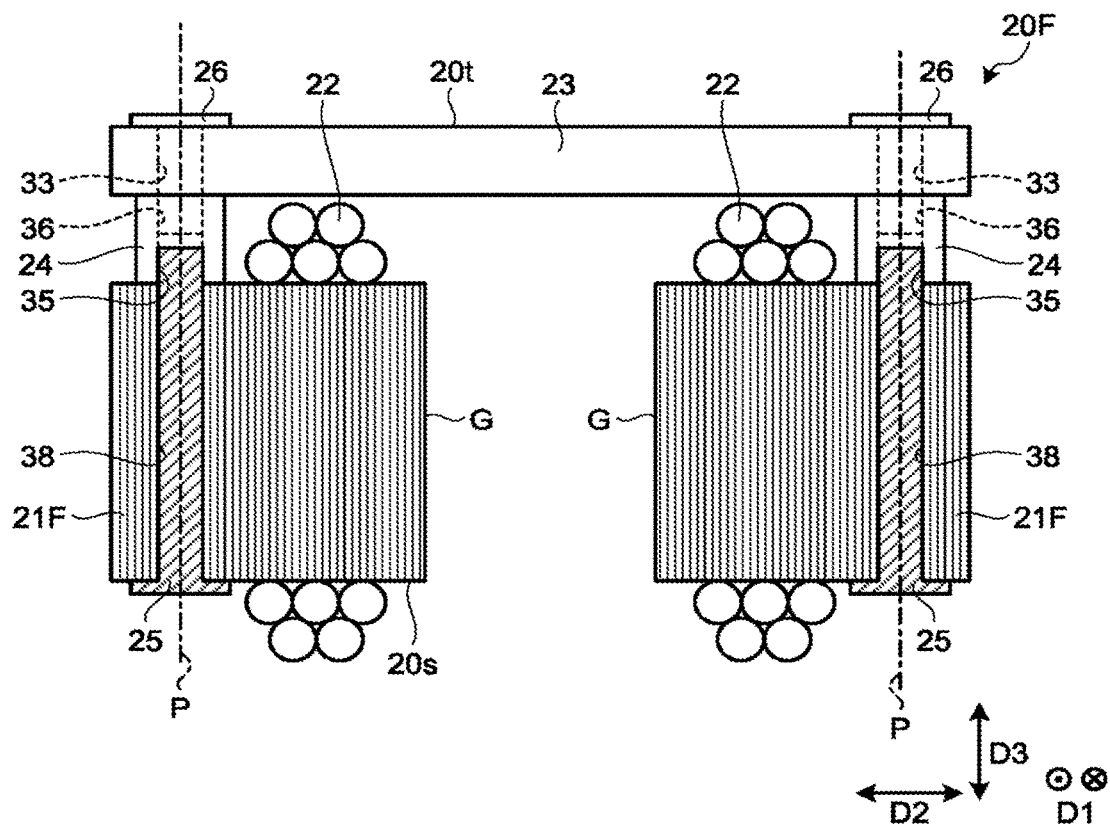
FIG. 20 is a cross-sectional view of an armature of the electric motor according to the seventh embodiment.

FIG. 20 is a cross-sectional view of the armature 20F of the electric motor 1F according to the seventh embodiment. As illustrated in FIG. 20, the first bolts 25 are inserted into first bolt holes 35 of the mounting members 24. The first bolt holes 35 are disposed in positions coinciding with the bolt holes 38 of the armature cores 21F when viewed in the third direction D3. The first bolts 25 are disposed at lower-side ends in the third direction D3 of the armature cores 21F. The first bolts 25 are passed through the bolt holes 38 of the armature cores 21F in the third direction D3 and inserted into the first bolt holes 35. Consequently, the armature cores 21F are fastened to the mounting members 24 by the first bolts 25. Thus, the first bolts 25 are provided at a lower-side end 20s, a first end, of the armature 20F in the third direction D3.

Second bolts 26, second fastening members, are inserted into the second bolt holes 36. The second bolts 26 are disposed at an upper-side end of the carrier 23. The second bolts 26 are passed through bolt holes 33 of the carrier 23 in the third direction D3 and inserted into the second bolt holes 36. Consequently, the carrier 23 is fastened to the mounting members 24 by the second bolts 26. Thus, the second bolts 26 are provided at an upper-side end 20t, a second end, of the armature 20F in the third direction D3.

As illustrated in FIG. 20, the carrier 23 is provided, across the two rows of armature cores 21F. The two rows of armature cores 21F share the carrier 23 provided therebetween. The carrier 23 is fixed to the mounting members 24 by the second bolts 26, the second fastening members. By the carrier 23 being fixed, across the two rows of armature cores 21F, the two rows of armature cores 21F are formed in a unitary configuration.

The mounting members 24, the first bolts 25, and the second bolts 26 are disposed in positions not overlapping the coils 22 when viewed in the third direction D3. Thus, the dimension between the top surfaces of the armature cores 21F and the carrier 23 can be set in a range that allows the disposition of upper end portions of the coils 22.

The first bolts 25 and the second bolts 26 are arranged in a straight line along the first direction D1 when viewed in the third direction D3. That is, the first bolts 25 and the second bolts 26 are disposed in planes P along the gap faces G. Thus, the first bolts 25 and the second bolts 26 are efficiently arranged in the second direction D2, so that a space in which to wind the coils 22 can be provided in the second direction D2.

As above, according to the seventh embodiment, the mounting members 24, the first bolts 25, and the second bolts 26 are disposed in positions not overlapping the coils 22 when viewed in the third direction D3 even in the configuration in which, in the armature 20F, the two rows of the armature cores 21F arranged in the first direction D1 are provided, spaced in the second direction D2, and the field element 10F is disposed between the two rows of the armature cores 21F in the second direction D2. Therefore, the dimension between the armature cores 21F and the carrier 23 can be set to a dimension that allows the disposition of the coils 22, and the dimensions of the mounting members 24 need not be considered. Thus, the dimension in the third direction D3 of the armature cores 21F can be increased, and the area of the gap faces G of the armature cores 21F can be made larger, so that the output of the electric motor 1F can be increased. Or the armature 20F can be configured to be reduced in size in the third direction D3 with respect to the armature cores 21F.

Eighth Embodiment.

Figure 21:
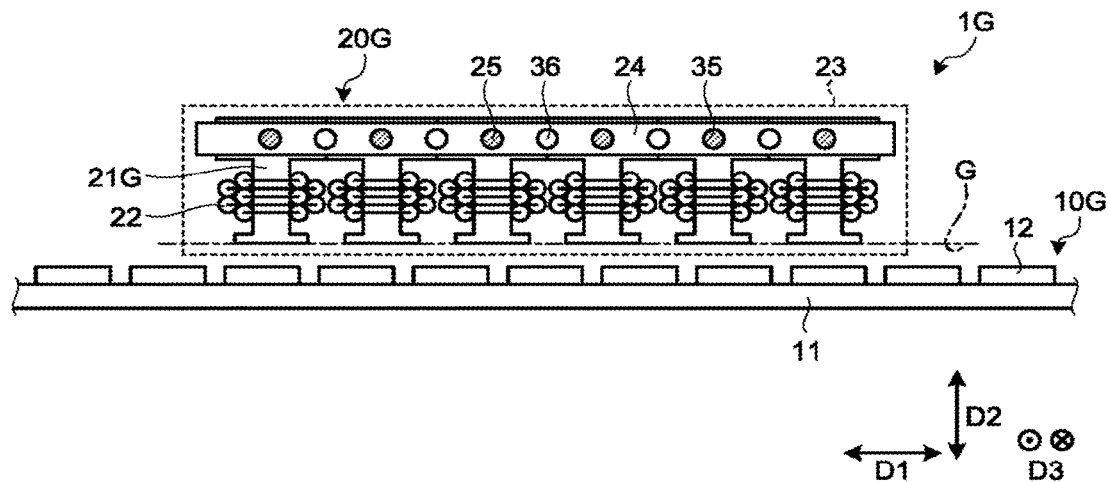
FIG. 21 is a plan view of an electric motor according to an eighth embodiment.
Figure 22:
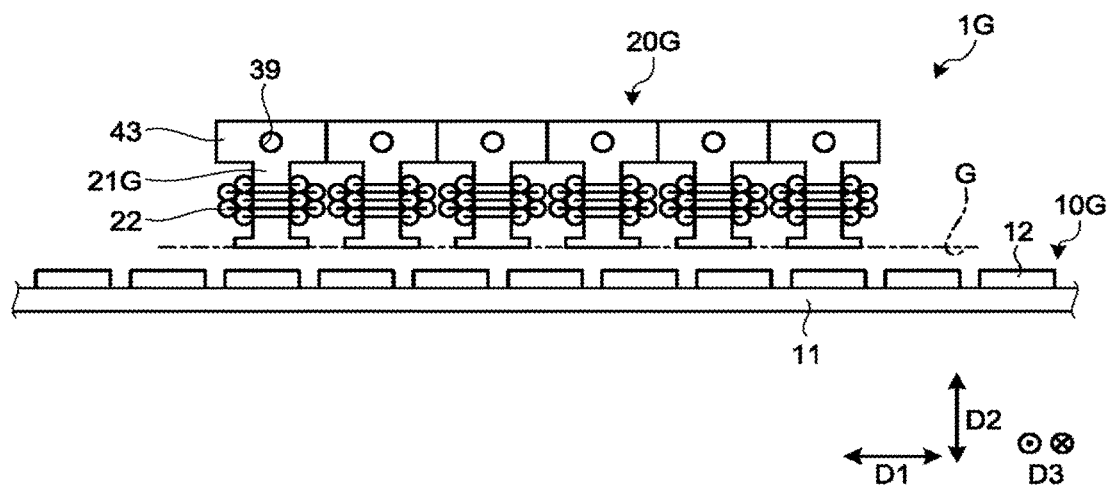
FIG. 22 is a plan view of the electric motor according to the eighth embodiment.

FIGS. 21 and 22 are plan views of an electric motor 1G according to an eighth embodiment. FIG. 22 illustrates a state where a mounting member 24 and a carrier 23 of the electric motor 1G illustrated in FIG. 21 are removed. In the eighth embodiment, the same components as those of the electric motor 1 according to the first embodiment are given the same reference characters, and their descriptions are omitted or simplified. As illustrated in FIGS. 21 and 22, the electric motor 1G includes a field element 10G and an armature 20G. The electric motor IG has one gap face G between the field element 10G and the armature 20G.

The field element 10G has a field yoke 11 and a plurality of permanent magnets 12. The field yoke 11 is formed in a shape extending in a first direction D1. The plurality of permanent magnets 12 is provided in a row along the first direction D1. The polarity of the permanent magnets 12 differs alternately in the first direction D1. The permanent magnets 12 are disposed with their magnetic poles facing in a second direction D2.

The armature 20G is disposed in the second direction D2 with respect to the field element 10G. The armature 20G has a plurality of armature cores 21G and coils 22. The plurality of armature cores 21G is provided in a row along the first direction D1. End faces of the armature cores 21G on the side of the field element 10G in the second direction D2 constitute the gap face G disposed opposite to the permanent magnets 12.

Protruding portions 43 protruding in the first direction D1 are formed at end portions of the armature cores 21G opposite to the field element 10G in the second direction D2. Distal ends of the protruding portions 43 abut each other between the armature cores 21G adjacent to each other. Bolt holes 39 are provided at end portions of the armature cores 21G on the side of the protruding portions 43 in the second direction D2. The bolt holes 39 are formed through the armature cores 21G in a third direction D3. First bolts 25, first fastening members, are inserted into the bolt holes 39. The bolt holes 39 are arranged in a line in the first direction D1 at the plurality of armature cores 21G.

The armature 20G has the carrier 23 and the mounting member 24. The mounting member 24 is disposed across all the plurality of armature cores 21G in the first direction D1.

Figure 23:
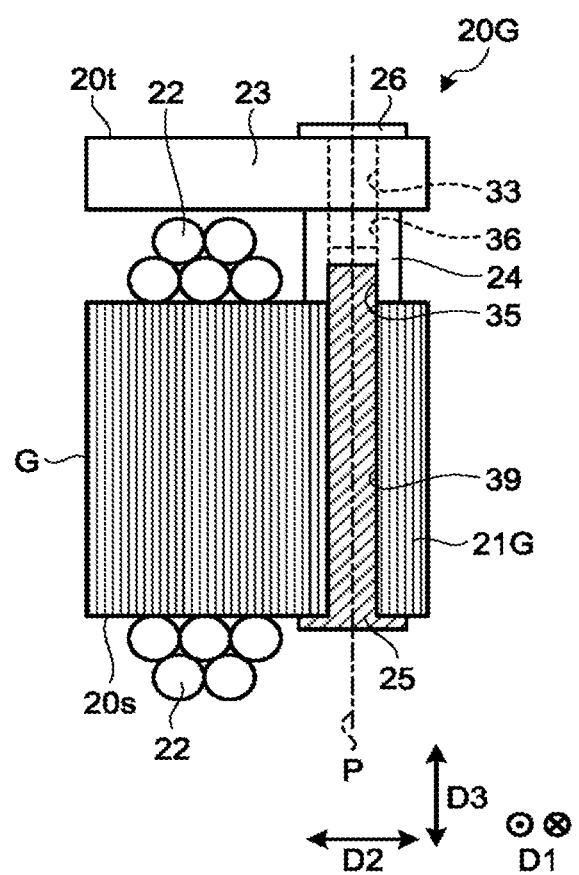
FIG. 23 is a cross-sectional view of an armature of the electric motor according to the eighth embodiment.

FIG. 23 is a cross-sectional view of the armature 20G of the electric motor 1G according to the eighth embodiment. As illustrated in FIG. 23, the first bolt 25 is inserted into a first bolt hole 35 of the mounting member 24. The first bolt hole 35 is disposed in a position coinciding with the bolt hole 39 of the armature core 21G when viewed in the third direction D3. The first bolt 25 is disposed at a lower-side end of the armature core 21G in the third direction D3. The first bolt 25 is passed through the bolt hole 39 of the armature core 21G in the third direction D3 and inserted into the first bolt hole 35. Consequently, the armature core 21G is fastened to the mounting member 24 by the first bolt 25. Thus, the first bolts 25 are provided at a lower-side end 20s, a first end, of the armature 20G in the third direction D3.

Second bolts 26, second fastening members, are inserted into the second bolt holes 36. The second bolts 26 are disposed at an upper-side end of the carrier 23. The second bolts 26 are passed through bolt holes 33 of the carrier 23 in the third direction D3 and inserted into the second bolt holes 36. Consequently, the carrier 23 is fastened to the mounting members 24 by the second bolts 26.

As illustrated in FIG. 3, the mounting member 24, the first bolt 25, and the second bolt 26 are disposed in positions not overlapping the coil 22 when viewed in the third direction D3. Thus, the dimension between the top surface of the armature core 21G and the carrier 23 can be set in a range that allows the disposition of an upper end portion of the coil 22. Thus, the second bolts 26 are provided at an upper-side end 20t, a second end, of the armature 20G in the third direction D3.

The first bolts 25 and the second bolts 26 are arranged in a straight line along the first direction D1 when viewed in the third direction D3. That is, the first bolts 25 and the second bolts 26 are disposed in planes P along the gap faces G. Thus, the first bolts 25 and the second bolts 26 are efficiently arranged in the second direction D2, so that a space in which to wind the coils 22 can be provided in the second direction D2.

As above, according to the eight embodiment, the mounting member 24, the first bolts 25, and the second bolts 26 are disposed in positions not overlapping the coils 22 when viewed in the third direction D3 even in the configuration with the one gap face G between the field element 10G and the armature 20G. Therefore, the dimension between the armature cores 21G and the carrier 23 can be set to a dimension that allows the disposition of the coils 22, and the dimensions of the mounting member 24 need not be considered. Thus, the dimension in the third direction D3 of the armature cores 21G can be increased, and the area of the gap face G of the armature cores 21G can be made larger, so that the output of the electric motor 1G can be increased. Or the armature 20G can be configured to be reduced in size in the third direction D3 with respect to the armature cores 21G.

The configurations shown in the above embodiments illustrate an example of the subject matter of the present invention, and can be combined with another known art, and can be partly omitted or changed without departing from the scope of the present invention.

REFERENCE SIGNS LIST

D1 first direction, D2 second direction, D3 third direction, G gap face, P and Q plane, 1, 1A, 1B, 1E, 1F, and 1G electric motor, 10, 10F, and 10G field element, 11 and 11F field yoke, 12 permanent magnet, 20, 20A, 20B, 20C, 20D, 20E, 20F, and 20G armature, 20t lower-side end portion, 20s upper-side end portion, 21, 21B, 21D, 21E, 21F, and 21G armature core, 22 coil, 23 and 23E carrier, 24, 24A, and 24B mounting member, 31, 31a, 31b, 32, 33, 34, 37, 38, and 39 bolt, hole, 25 first bolt, 25B and 26B bolt, 26 second bolt, 27 insulator, 27a recessed portion, 35 first bolt hole, 36 second bolt hole, 40 and 41 protruding portion, 42 and 43 protruding portion.

The invention claimed is:

1. An electric motor comprising:
a field element; and
an armature to generate thrust between the armature and the field element to move the armature;
the field element including a plurality of magnets arranged in a line, with polarity differing alternately in a first direction, which is a direction in which the armature moves,
the armature being disposed in a position opposite to the magnets in a second direction orthogonal to the first direction, the armature including
a plurality of armature cores arranged in a line in the first direction, coils wound on an area of the armature cores in the second direction,
a carrier including a space in which to dispose the coils left in a third direction orthogonal to the first direction and the second direction with respect to the plurality of armature cores, and
at least one mounting member to fix the plurality of armature cores and the carrier,
the plurality of armature cores being fixed to the at least one mounting member by first fastening members that extend into holes in a first side in the third direction of the at least one mounting member,
the carrier being fixed to the at least one mounting member by second fastening members that extend into holes in a second side in the third direction of the at least one mounting member,
the at least one mounting member, the first fastening members, and the second fastening members being disposed in positions not overlapping the coils when viewed from the third direction,
the at least one mounting member comprising a plurality of mounting members, the plurality of mounting members being disposed at both ends of the plurality of armature cores in the second direction.

2. The electric motor according to claim 1, wherein
the field element includes two rows of the magnets arranged in the first direction, spaced in the second direction, and
the armature is disposed between the two rows of the magnets in the second direction.

3. The electric motor according to claim 1, wherein
the field element includes one row of the magnets arranged in the first direction, and
the armature is disposed opposite to the row of the magnets.

4. The electric motor according to claim 1, wherein
the armature includes a gap face opposite to the magnets, and
the first fastening members and the second fastening members are disposed in a plane parallel to the gap face.

5. The electric motor according to claim 1, wherein
the at least one mounting member is formed using a non-magnetic material.

6. The electric motor according to claim 5, wherein
the at least one mounting member is formed using a non-conductive material.

7. The electric motor according to claim 1, wherein
the armature includes insulators between the armature cores and the coils, and
the insulators include recessed portions of a shape corresponding to the second fastening members at both ends in the second direction.

8. The electric motor according to claim 1, wherein
the armature cores include insertion holes through which the first fastening members are inserted, and have protruding portions protruding in the first direction along a shape of the insertion holes.

9. The electric motor according to claim 1, wherein the plurality of mounting members are separated from each other.

10. The electric motor according to claim 1, wherein the at least one mounting member is arranged between the plurality of armature cores and the carrier.

11. An electric motor comprising:
a field element; and
an armature to generate thrust between the armature and the field element to move the armature;
the field element including a plurality of magnets arranged in a line, with polarity differing alternately in a first direction, which is a direction in which the armature moves,
the armature being disposed in a position opposite to the magnets in a second direction orthogonal to the first direction, the armature including
a plurality of armature cores arranged in a line in the first direction,
coils wound on an area of the armature cores in the second direction,
a carrier provided with a space in which to dispose the coils left in a third direction orthogonal to the first direction and the second direction with respect to the plurality of armature cores, and
at least one mounting member to fix the plurality of armature cores and the carrier,
the plurality of armature cores being fixed to the at least one mounting member by first fastening members that extend into holes in a first side in the third direction of the at least one mounting member,
the carrier being fixed to the at least one mounting member by second fastening members that extend into holes in a second side in the third direction of the at least one mounting member, and
the at least one mounting member, the first fastening members, and the second fastening members being disposed in positions not overlapping the coils when viewed from the third direction.

12. The electric motor according to claim 11, wherein
the at least one mounting member includes insertion holes passing through the at least one mounting member in the third direction, into which the first fastening members are inserted from the first side and the second fastening members are inserted from the second side.

13. The electric motor according to claim 11, wherein
the field element includes two rows of the magnets arranged in the first direction, spaced in the second direction, and
the armature is disposed between the two rows of the magnets in the second direction.

14. The electric motor according to claim 11, wherein
the field element includes one row of the magnets arranged in the first direction, and
the armature is disposed opposite to the row of the magnets.

15. The electric motor according to claim 11, wherein
the armature includes a gap face opposite to the magnets, and
the first fastening members and the second fastening members are disposed in a plane parallel to the gap face.

16. The electric motor according to claim 11, wherein
the at least one mounting member is formed using a non-magnetic material.

17. The electric motor according to claim 16, wherein
the at least one mounting member is formed using a non-conductive material.

18. The electric motor according to claim 11, wherein
the armature includes insulators between the armature cores and the coils, and the insulators include recessed portions of a shape corresponding to the second fastening members at both ends in the second direction.

19. The electric motor according to claim 11, wherein the armature cores include insertion holes through which the first fastening members are inserted, and have protruding portions protruding in the first direction along a shape of the insertion holes.

20. An electric motor comprising:
a field element; and
an armature to generate thrust between the armature and the field element to move the armature;
the field element including a plurality of magnets arranged in a line, with polarity differing alternately in a first direction, which is a direction in which the armature moves,
the armature being disposed in a position opposite to the magnets in a second direction orthogonal to the first direction, the armature including
a plurality of armature cores arranged in a line in the first direction,
coils wound on an area of the armature cores in the second direction,
a carrier provided with a space in which to dispose the coils left in a third direction orthogonal to the first direction and the second direction with respect to the plurality of armature cores, and
at least one mounting member to fix the plurality of armature cores and the carrier,
the plurality of armature cores being fixed to the at least one mounting member by first fastening members that extend into holes in a first side in the third direction of the at least on mounting member,
the carrier being fixed to the at least one mounting member by second fastening members that extend into holes in a second side in the third direction of the at least one mounting member,
the at least one mounting member, the first fastening members, and the second fastening members being disposed in positions not overlapping the coils when viewed from the third direction,
wherein
the armature includes two rows of the armature cores arranged in the first direction, spaced in the second direction, and
the field element is disposed between the two rows of the armature cores in the second direction.

21. The electric motor according to claim 20, wherein the armature includes a gap face opposite to the magnets, and
the first fastening members and the second fastening members are disposed in a plane parallel to the gap face.

22. The electric motor according to claim 20, wherein the at least one mounting member is formed using a non-magnetic material.

23. The electric motor according to claim 22, wherein the at least one mounting member is formed using a non-conductive material.

24. The electric motor according to claim 20, wherein the armature includes insulators between the armature cores and the coils, and
the insulators include recessed portions of a shape corresponding to the second fastening members at both ends in the second direction.

25. The electric motor according to claim 20, wherein the armature cores include insertion holes through which the first fastening members are inserted, and have protruding portions protruding in the first direction along a shape of the insertion holes.

* * * * *